United States Patent [19]

Fischer

[11] 3,862,106

[45] Jan. 21, 1975

[54] THERMOPLASTIC BLEND OF PARTIALLY CURED MONOOLEFIN COPOLYMER RUBBER AND POLYOLEFIN PLASTIC

[75] Inventor: William K. Fischer, Woodbury, Conn.

[73] Assignee: Uniroyal, Inc., New York, N.Y.

[22] Filed: June 4, 1973

[21] Appl. No.: 366,927

Related U.S. Application Data

[62] Division of Ser. No. 108,225, Jan. 20, 1971, Pat. No. 3,758,643.

[52] U.S. Cl.......... 260/80.78, 260/897 A, 260/45.7, 260/79.5 P, 260/88.25
[51] Int. Cl........................ C08f 29/12, C08f 37/18
[58] Field of Search.................................. 260/80.78

[56] References Cited
UNITED STATES PATENTS

| 3,012,020 | 12/1961 | Kirk, Jr. et al..................... 260/88.2 |
| 3,256,366 | 6/1966 | Corbelli............................. 260/897 |
| 3,758,643 | 9/1973 | Fischer........................... 260/897 A |
| 3,817,952 | 6/1974 | Knabeschuh..................... 260/80.78 |

FOREIGN PATENTS OR APPLICATIONS 1,043,078   9/1966   Great Britain..................... 260/897

OTHER PUBLICATIONS

Alliger–Sjothun: "Vulcanization of Elastomers," 1964, Reinhold, pages 95–96.
Hofmann: "Vulcanization and Vulcanizing Agents," 1967, Palmerton, pages 5–19.

Primary Examiner—Joseph L. Schofer
Assistant Examiner—A. L. Clingman
Attorney, Agent, or Firm—James J. Long

[57] ABSTRACT

Thermoplastic blends of partially cured monoolefin copolymer rubber (such as EPM or EPDM rubber) with a polyolefin resin (such as polypropylene) exhibit good physical properties and are reprocessable. The partial cure of the rubber is effected by heating the rubber with a curative such as a peroxide. The blends are used to make molded or extruded articles which have good physical properties without requiring vulcanization; preferred blends have the characteristics of thermoplastic elastomers.

3 Claims, No Drawings

THERMOPLASTIC BLEND OF PARTIALLY CURED MONOOLEFIN COPOLYMER RUBBER AND POLYOLEFIN PLASTIC

This is a division of application Ser. No. 108,225 filed Jan. 20, 1971, now U.S. Pat. No. 3,758,643 issued Sept. 11, 1973.

This invention relates to a thermoplastic blend and a method of making same.

Thermoplastic elastomers, which can be processed and fabricated by methods used for thermoplastics and do not require vulcanization to develop elastomeric properties, are known (see, for example, U.S. Pat. No. 3,265,765, Holden et al., Aug. 9, 1966; also Hartman et al. "Butyl Grafted to Polyethylene yields Thermoplastic Elastomer" Rubber World, Oct. 1970, pages 59–64). Conventionally these materials have been made by special block copolymerization or polymer grafting methods. The present invention is based on the discovery that a thermoplastic elastomeric composition can be made by blending a certain rubber and resin.

Blends of monoolefin copolymers with polyolefins have been known (e.g., U.S. Pat. Nos. 3,256,366 Corbelli et al., June 14, 1966 and 3,456,038 Newman et al., July 15, 1969; British Pat. No. 1,043,078, Phillips Petroleum Co., Sept. 21, 1966; Canadian Pat. Nos. 789,074 Brender et al., July 2, 1968 and 792,277, Schreiber, Aug. 13, 1968; Belgian Pat. No. 731,950, Sumitomo Chemical Co., Oct. 23, 1969, etc.), but those blends have not had the characteristics of thermoplastic elastomers.

The present invention is based on the discovery that a thermoplastic blend having highly desirable characteristics is provided by a partially cured rubber in admixture with a resin. More particularly, the invention is based on a blend of partially cured monoolefin copolymer rubber and polyolefin plastic, which blend is thermoplastic and can be fabricated by such methods as molding and extrusion, into shaped articles, which do not require a vulcanization step to develop good physical properties. The invention thus provides thermoplastic elastomers which can be molded or otherwise shaped without necessity for performing an expensive and time-consuming vulcanization step in the shaped article. Furthermore the blends can be reprocessed, just like a typical thermoplastic material.

In accordance with the invention the monoolefin copolymer rubber, typified by saturated EPM (ethylene-propylene copolymer rubber) or unsaturated EPDM (ethylenepropylene-non-conjugated diene terpolymer rubber), is partially cured by the action of a conventional curing agent. The curing conditions are such that the cure of the rubber is only partial, that is, the rubber is not cross-linked to the state where it becomes almost entirely insoluble in the usual solvents for the uncured rubber. It has been found that monoolefin rubber which has thus been partially cured or crosslinked, provides, in admixture with a polyolefin plastic, a thermoplastic material having the herein describe unusual combination of desirable characteristics.

In carrying out the invention the monoolefin copolymer rubber component of the blend is first mixed with a small amount of curative, and subjected to curing conditions. The amount of curative and the curing conditions are so selected as to produce only a partial cure of the rubber as evidenced by conventional tests suitable for determining the degree of cure or cross-linking of an elastomer, such as various solubility and swelling tests, including conventional gel determinations, tests for crosslink density, tests for combined sulfur when sulfur cures are used, and the like. Another method for determining a partial state of cure is to observe whether the material processes on a mill to form a continuous band or whether it fails to knit, which would indicate over-curing. The blend of the invention is provided by mixing the partially cured monoolefin rubber with a polyolefin plastic.

The monoolefin copolymer rubber employed in the blend of the invention is an amorphous, random, elastomeric copolymer of two or more monoolefins, with or without a copolymerizable polyene. Usually two monoolefins are used, but three or more may be used. Ordinarily one of the monoolefins is ethylene while the other is preferably propylene. However other alpha-monoolefins may be used including those of the formula $CH_2=CHR$ where R is an alkyl radical having for example 1 to 12 carbon atoms (e.g., butene-1, pentene-1, hexene-1, 4-methylpentene-1, 5-methylhexene-1, 4-ethylhexene-1, etc.). While the monoolefin copolymer rubber may be a saturated material, as in ethylene-propylene binary copolymer rubber ("EPM") it is ordinarily preferred to include in the copolymer a small amount of at least one copolymerizable polyene to confer unsaturation on the copolymer. Although conjugated dienes such as butadiene or isopene may be used for this purpose (British Pat. No. 983,437; Belgian Pat. No. 736,717, Sumitomo Chemical Co. Jan. 29, 1970) in practice it is usual to employ a nonconjugated diene, including the open-chain non-conjugated diolefins such as 1,4-hexadiene (U.S. Pat. No. 2,933,480 Gresham et al., Apr. 19, 1960) or a cyclic diene, especially a bridged ring cyclic diene, as in dicyclopentadiene (U.S. Pat. No. 3,211,709, Adamek et al, Oct. 12, 1965), or an alkylidenenorbornene as in methylenenorbornene or ethylidenenorbornene (U.S. Pat. No. 3,151,173, Nyce, Sept. 29, 1964), as well as cyclooctadiene, methyltetrahydroindene, etc. (see also such U.S. Pat. Nos. as 3,093,620 and 3,093,621; also 3,538,192 col. 6, line 49 to col. 7, line 51). The polyenes employed are not limited to those having only two double bonds, but include those having three or more double bonds.

The polyolefin resin with which the semi-cured monoolefin copolymer rubber is mixed to make the blend of the invention is a solid, high molecular weight resinous plastic material made by polymerizing such olefins as ethylene, propylene, butene-1, pentene-1, 4-methylpentene, etc., in conventional manner. Thus, such crystalline polyolefins as a polyethylene (either of the low density [e.g., 0.910–0.925 g/cc], medium density [0.926–0.940 g/cc] or high density [e.g., 0.941–0.965 g/cc] type) may be used, whether prepared by high pressure processes or low pressure processes, including linear polyethylene. Polypropylene is a preferred polyolefin plastic, having highly crystalline isotactic and syndiotactic forms. Frequently the density of polypropylene is from 0.800 to 0.980 g/cc. Largely isotactic polypropylene having a density of from 0.900 to 0.910 g/cc may be mentioned particularly. Crystalline block copolymers of ethylene and propylene (which are plastics distinguished from amorphous, random ethylenepropylene elastomers) can also be used. Included among the polyolefin resins are the higher alpha-olefin modified polyethylenes and polypropylenes (see "Polyolefins," N.V. Boenig, Elsevier Publishing Co., N.Y., 1966).

The relative proportions of partially cured monoolefin copolymer rubber and polyolefin plastic employed in the blends of the invention may vary widely, for example from 10 to 90 parts by weight of partially cured monoolefin copolymer rubber and correspondingly 90 to 10 parts of polyolefin plastic, depending on the characteristics desired in the blends. Of particular importance are the blends having an elastomeric character, containing a major proportion of the partially cured monoolefin copolymer rubber, usually 50 to 90 parts of the semi-cured rubber, more preferably 60 to 80 parts, per 100 parts by weight of the blend of rubber and plastic.

As indicated, an important feature of the invention resides in semi-curing the monoolefin copolymer rubber to be mixed with the polyolefin plastic. For this purpose any conventional curative may be employed, including such free-radical generating agents or cross-linking agents as the peroxides, whether aromatic or aliphatic as in the aromatic diacyl peroxides and aliphatic diacyl peroxides, dibasic acid peroxides, ketone peroxides, alkyl peroxyesters, alkyl hydroperoxides, e.g., diacetylperoxide, dibenzoylperoxide, bis-2,4-dichlorobenzoyl peroxide, di-tert.butyl peroxide, dicumylperoxide, tert.-butylperbenzoate, tert.-butylcumyl peroxide, 2,5-bis (tert.-butylperoxy)-2,5-dimethylhexane, 2,5-bis-(tert.-butylperoxy)-2,5-dimethylhexyne-3; 4,4,4',4'-tetra-(tert.-butylperoxy)-2,2-dicyclohexylpropane, 1,4-bis-(tert.-butylperoxyisopropyl)-benzene, 1,1-bis-(tert.-butylperoxy)-3,3,5-trimethylcyclohexane, lauroyl peroxide, succinic acid peroxide, cyclohexanone peroxide, tert.-butyl peracetate, butyl hydroperoxide, etc. Also suitable are the azide types of curing agents including such materials as the azidoformates [e.g., tetramethylenebis(azidoformate); for others see U.S. Pat. No. 3,284,421, Breslow, Nov. 8, 1966], aromatic polyazides (e.g. 4,4'-diphenylmethane diazide; for others see U.S. Pat. No. 3,297,674, Breslow et al, Jan. 10, 1967), and sulfonazides such as p,p'-oxybis (benzene sulfonyl azide), etc. Other curatives that may be used include the aldehyde-amine reaction products such as formaldehyde-ammonia, formaldehydeethylchloride-ammonia, acetaldehyde-ammonia, formaldehydeaniline, butyraldehyde-aniline, heptaldehyde-aniline, heptaldehyde-formaldehyde-aniline, hexamethylenetetramine, alpha-ethyl-beta-propylacrolein-aniline; the substituted ureas [e.g., trimethylthiourea, diethylthiourea, dibutylthiourea, tripentylthiourea, 1,3-bis(2-benzothiazolylmercaptomethyl) urea, and N,N-diphenylthiourea]; guanidines (e.g., diphenylguanidine, di-o-tolylguandine, diphenylguanidine phthalate, and di-o-tolylguanidine salt of dicatechol borate); xanthates (e.g., zinc ethylxanthate, sodium isopropylxanthate, butylxanthic disulfide, potassium isopropylxanthate, and zinc butylxanthate; dithiocarbamates (e.g., copper dimethyl-,zinc dimethyl-, tellurium diethyl-, cadmium dicyclohexyl-, lead dimethyl-, selenium dibutyl-, zinc pentamethylene-, zinc didecyl-, and zinc isopropyloctyl-, dithiocarbamate); thiazoles [e.g., 2-mercaptobenzothiazole; zinc mercaptothiazolyl mercaptide, 2-benzothiazolyl-N,N-diethylthiocarbamyl sulfide, and 2,2'-dithiobis (benzothiazole)]; imidazoles (e.g., 2-mercaptoimidazoline and 2-mercapto-4,4,6-trimethyldihydropyrimidine); sulfeneamides [e.g., N-t-butyl-2-benzothiazole-, N-cyclohexylbenzothiazole-, N,N-diisopropylbenzothiazole-, N-(2,6-dimethylmorpholino)-2-benzothiazole-, and N,N-diethylbenzothiazole-sulfenamide]; thiuramdisulfides (e.g., N,N'-diethyl-, tetrabutyl-, N,N'-diisopropyldioctyl-, tetramethyl-, N,N'-dicyclohexyl-, and N,N'-tetralauryl- thiuramdisulfide); also paraquinonedioxime, dibenzoparaquinonedioxime, etc. as well as sulfur itself (see Encyclopedia of Chemica Technology, Vol. 17, 2nd edition, Interscience Publishers, 1968; also Organic Peroxides, Daniel Severn, Vol. 1, Wiley-Interscience, 1970). The peroxide curative may be used alone, or in conjunction with the usual auxilliary substances such as sulfur, maleimides including bis-maleimides, poly-unsaturated compounds (e.g., cyanurate), acrylic esters (e.g., trimethylolpropanetrimethacrylate), etc. With sulfur curatives, such as sulfur itself or sulfur donors, it is usually desirable to include an accelerator of sulfur vulcanization as well as an activator (e.g., a metal salt or oxide), as in conventional practice. Mixed peroxide-type or mixed sulfur-type curing systems may be employed if desired such as dicumylperoxide plus 2,5-bis(tert.-butylperoxy)-2,5-dimethylhexane or sulfur plus tetramethylthiuramdisulfide. The preferred monoolefin copolymers having residual unsaturation, conferred by the presence of a polyene, such as EPDM, afford the widest choice of curatives. Reference may be had to "Vulcanization and Vulcanizing Agents," W. Hoffman, Palmerton Publishing Co., N.Y., 1967, for an extensive disclosure of curing agents.

In accordance with the invention, the amount of cure or cross-linking imparted to the monoolefin copolymer rubber component of the blend is only partial, as distinguished from a full or substantially complete cure or crosslinking. As indicated, various tests for cure or degree of cross-linking may be applied, one of the more convenient tests being the content of gel or insoluble material. For purposes of the invention, the gel content of the semi-cured or partially cross-linked monoolefin copolymer rubber should be substantially in excess of the gel content of the original rubber prior to the partial curing step. Thus, the gel content of the partially cured monoolefin copolymer rubber, measured in cyclohexane, will ordinarily be at least 10% in excess of the original gel content of the rubber, preferably at least 20% in excess, and more preferably at least 30% in excess of the gel content of the original uncured rubber. Ordinarily the gel content of the monoolefin copolymer rubber as semi-cured for purposes of the invention will be at least 30% but less than 90% in cyclohexane. In many cases the gel content, in cyclohexane, of the partially cured rubber preferably falls within the range of from 40% to 85% more preferably 55 to 75%. The gel is of course the portion of the rubber that is insoluble in the specified solvent, in this case cyclohexane, and is conveniently measured by immersing a sample of the material in the solvent for 48 hours at 73°F, taking an aliquot of the solution and determining the concentration of solute by evaporating the solvent. It will be understood that with other solvents at other temperatures, the gel value of a particular sample may be different. Thus, measured in boiling xylene the gel values of the present semi-cured monoolefin copolymer rubber would ordinarily be very much lower than (e.g., 30–40% lower) the given gel values in cyclohexane at 73°C.

The gel formed as a result of the described crosslinking treatment typically has a much lower swelling index than gel sometimes found in the original, untreated monoolefin copolymer rubber. Typically the percent swell of the cyclohexane-insoluble gel formed as a result of the present semi-cure is at least 8% less, usually 10 to 70% less, than the percent swell of any gel present originally. Ordinarily the percent swell of the semi-cured monoolefin copolymer rubber is within the range of from 6 to 35%. (percent gel and percent swell are elucidated in more detail in U.S. Pat. No. 3,012,020, Kirk et al. Dec. 5, 1961.)

The desired semi-cure of the monoolefin copolymer rubber is brought about by mixing the rubber with a small amount of the curing or cross-linking agent, and subjecting the mixture to conventional curing conditions. It will be understood that the curing or cross-linking parameters (viz., the amount of curing agent, and/or the curing temperature and/or the curing time) will be so selected as to produce a partial or semi-cure, rather than a full or substantially complete cure. Thus, in many cases use of less than two-thirds, or use of less than one-half, and in some cases one-fourth or less, of the amount of curative conventionally required for full cure, is capable of producing the desired degree of partial cure in the monoolefin copolymer rubber, as evidenced by the development of a gel content in cyclohexane within the described range. Such gel content is distinguished from values of 100% gel content in cyclohexane displayed by the copolymer even before it is fully cured. Fully cured or cross-linked monoolefin copolymer rubber is almost entirely insoluble even in boiling xylene. It will also be understood that fully cured monoolefin copolymer rubber will not form a continuous sheet on a mill, that is, it is not a processable material.

The partial cure of the monoolefin copolymer rubber in admixture with the cross-linking agent may be brought about under dynamic conditions or under static conditions. To effect the semi-cure dynamically, the copolymer-curing agent mix may be worked on an open roll mill, or in an internal mixer (such as a Banbury mixer or an extruder). Frequently, working at a temperature of 160° to 400°F for 5 or 10 minutes is sufficient to bring about the desired semi-cure. To effect the semi-cure statically, the copolymer-curing agent mix may be treated for example in an autoclave, for example at a temperature of 160° to 500°F for 5 to 30 minutes.

The cross-linking treatment substantially exhausts the action of the curing agent so that there is little or no tendency for further advancement of cure to take place subsequently. Ordinarily, heating of the rubber-curative mix for a period of time equal to at least four half-lives of the peroxide or other curative is desirable. It is sometimes desirable to insure termination of the action of any remaining cross-linking agent, by adding to the mix, at the end of the partial curing step, a small amount of a free-radical scavenging agent, such as a stabilizer or antioxidant. In the dynamic semi-cure method, such stabilizer may be added and mixed in for the last minute or so of mixing. In the static semi-cure method, after removal of the semi-cured material from the autoclave, the semi-cured material may be subjected to one or more "refining" passes on a mill, and the stabilizer may be added in the course of or just prior to the blending with the polyolefin plastic. Any conventional antioxidant or stabilizer may be used, including, by way of non limiting example, amine types, phenolic types, sulfides, phenyl alkanes, phosphites, etc. Representative materials are listed in "Rubber: Natural and Synthetic," Stern, Palmerton Publishing Co., N.Y., 1967, of which the disclosure at pages 244–256 is incorporated herein by reference; see also "Chemistry and Technology of Rubber" Davis & Blake, Reinhold, N.Y., 1937, Chapter XII. Included are such materials as 2,2,4-trimethyl-1,2-dihydroquinoline, diphenylamine acetone condensate, aldol alphanaphthylamine, octylated diphenylamine, N-phenyl-N'-cyclohexyl-p-phenylene diamine, 2,6-di.tert.-butyl-4-methyl phenol, styrene-resorcinol resin, o-cresol monosulfide, di-p-cresol-2-propane, 2,5-di-tert.amyl hydroquinone, dilauryl 3,3'-thiodipropionate, etc.

The thus partially cross-linked monoolefin copolymer rubber may be tested for gel content in cyclohexane and/or for processability (band formation on a mill). Such tests will reveal whether the polymer has received insufficient cross-linking on the one hand (gel content too low; swelling index high) or too much cross-linking on the other hand (gel content too high; inability to form a band on a tightly closed low-friction mill in spite of considerable refining). One or two preliminary tests on a small trial batch will usually suffice to establish a proper amount of a particular curing agent to employ with a specific copolymer under a given set of pre-curing conditions. Appropriate manipulation of the variables may be made in any given case to produce a satisfactory result, using the working examples below as a guide.

Although in general the conditions under which the partial cure of the monoolefin copolymer rubber is effected may fall within the ranges of conventional vulcanizing conditions, it will be understood that care will be taken to limit the degree of cure, either by using reduced amount of curative and/or reduced duration or severity of the curing conditions, so that the rubber does not become completely cross-linked but remains at least partially soluble and thermoplastic, as distinguished from an insoluble, thermoset, fully cured rubber which is no longer processable. Although certain curing systems operate at room temperature it is more usual to heat the monoolefin copolymer containing the curative to bring about partial cure. Moderate heating (e.g. 100°–150°F) is frequently sufficient although in some cases considerably higher temperatures (e.g., 300°–500°F or more) may be used in the partial cure. The time required for the partial cure will vary with such factors as the particular copolymer rubber employed, the kind and amount of curative, and the temperature at which the partial cure is carried out, as well as other factors such as the size of the batch, the character of the heating device employed, whether the treatment is dynamic or static, etc. In general the time is inversely related to the temperature and concentration of curative, and more severe timetemperature conditions may be used in the static method than in the dynamic method.

The semi-cured monoolefin copolymer rubber is a thermoplastic, processable material as evidenced by the fact that it knits together to form a continuous sheet or band on a roll mill. In some cases where the degree of semicure has been relatively high, it may be necessary to break the material down slightly by milling, before it will band. Thus, if the semi-cured rubber has a gel content in cyclohexane in excess of 90%, it may be broken down by milling until the gel content is less than 90%, making it suitable for use in the invention. If the cure has gone beyond the point where the material can be broken down, the material is not suitable. The gel content of the semi-cured rubber at or prior to mixing with the resin should be less than 90%.

The thus pre-treated partially cross-linked monoolefin copolymer rubber may be blended with the polyolefin plastic in any appropriate conventional manner, for example on a roll mill, in a Banbury mixer or in an extruder to provide the thermoplastic blend of the invention. The mixing temperature should be sufficient to soften the plastic and form a uniform mix. Pigments, fillers, stabilizers, lubricants, u.v. screening agents, or other appropriate compounding or modifying ingredients may be included in the blend if desired. The blend of the invention provides a noteworthy combination of processability (including the ability to be reprocessed repeatedly) with good physical characteristics. The good physical characteristics include properties heretofore usually associated only with vulcanized or thermoset (not reprocessable) materials, notably low permanent set. The blends of the invention accordingly afford a way of producing thermoformed shaped objects (e.g., by extrusion, injection or compression molding) which combine the convenience and speed and thermoplastic shaping with certain physical characteristics of thermoset or vulcanized elastomers.

Heretofore, certain desirable characteristics such as low permanent set have largely been obtainable only in vulcanized elastomers which required the molder to use a rather long dwell time in the mold to effect vulcanization. The vulcanized flash or scrap could not be reprocessed. On the other hand, thermoplastic materials could be molded rapidly and scrap could be reprocessed, but certain physical characteristics such as permanent set were usually rather poor. The present blends of partially pre-cured monoolefin copolymer rubber and polyolefin plastic combine in one material the advantages of rapid moldability and re-processability with the advantages of a vulcanizate (low permanent set).

It will be understood that in many plastic and elastomer shaping operations a considerable percentage of scrap is produced. Examples of this are in dieing out parts from extruded, press-molded or calendered sheet and sprues and runners which result from screw-injection molding. Such scrap produced from the blend of the invention may be chopped and re-extruded seven or more times with no significant deterioration in appearance or processing characteristics. The blends, in addition to being reprocessable, have enhanced properties including tensile strength and resistance to compression set, resistance to deterioration in oil, reduced elongation set, and improved resistance to abrasion and flex-cracking.

Useful articles that may be made from the blends of the invention by such methods as extrusion, screwinjection, blow molding, press molding, calendering and vacuum forming include extruded insulation on wire, gaskets, flexible tubing, balls, weatherstripping, flexible bumpers, etc.

The blend of the invention will of course invariably contain a substantial amount (e.g., at least 10% by weight) of each polymer, and the blends of particular interest are those in which the semi-cured monoolefin copolymer rubber constitutes at least half of the blend of the two polymers. The blends containing 50–90% (by weight, based on the sum of the weight of the two polymers) predominate in elastomeric properties and are preferred, while with decreasing amounts of partially cured monoolefin copolymer rubber the blends take on more the characteristics of a hard rubber or plastic. If desired, mixtures of EPM's or EPDM's or both may be used with one or more polyolefins.

In comparison to a commercially available thermoplastic elastomer which is a butadiene-styrene block copolymer known as Kraton 3,125, blends of the invention have been observed to have higher hardness and, more importantly, much greater retention of hardness when heated to elevated temperatures of 200° or 300°F, for example. The heat deflection upon subjecting to 2,000 grams pressure per square inch for 1 hour at 250°F was zero for compositions of the invention, but 67% for the conventional block copolymer. The volume change of compositions of the invention after immersion 24 hours at 150°F in fuel B was of the order of 141 to 308%, whereas the block copolymer dissolved. In No. 2 oil, the volume change of compositions of the invention was 26–57%; the block copolymer changed 85%.

As indicated, processability, and particularly reprocessability, is an important characteristic of the blends of the invention. The processability of the blends may be evaluated by subjecting samples of the blend to such shaping operations as extrusion, injection molding, or compression molding, as described in the working examples below. Extrusion is the shaping method of choice where long continuous forms, such as hose, window seals, wire coatings, flat sheets, etc. are desired. It is important that the extruded article have acceptable surface smoothness. In most cases the materials of the invention are well adapted to extrusion methods, although in some cases, particularly where the gel level is on the high side, the extruded surfaces may not be as smooth to the touch as desirable. However, even the blends which are not satisfactorily extrudable can usually be shaped by injection molding. For satisfactory screw injection molding the material must form in the mold a homogenous article of uniform strength. The flow viscosity characteristics of such blends are adequate to insure filling the mold under the operating conditions. The most highly semi-cured rubbers usually give blends of the invention which are ordinarily best shaped by press molding.

The elastomeric character of objects shaped without vulcanization from blends of the invention is perhaps evidenced most strikingly by the low elongation set at break, measured by ASTM D412. In the present preferred elastomeric blends, the elongation set at break is usually improved (i.e. decreased) by at least 30%, preferably by at least 50%. However other physical properties such as tensile strength and ultimate elongation at break are also significant, and the combined effect of these properties is conveniently expressed as a "performance factor", P.F., which is defined as follows:

P.F., psi $\times$ 10$^3$ = [(Tensile, psi) $\times$ (Elongation, %)]/[Elongation Set at Break,%]

where the tensile strength and the elongation are measured by method ASTM D412. As will be made manifest in the working examples below, the "performance factor" of blends of the invention is improved (increased) by at least 20% more frequently by 45%, over the performance factor of otherwise similar blends in which the rubber is not semicured. In highly preferred blends, the performance factor is increased to two or more times its control value.

The reprocessability of the blends of the invention is demonstrated by the fact that blends of the invention have been extruded and re-extruded up to seven times and still retained desirable characteristics.

The following examples, in which all parts are expressed by weight, will serve to illustrate the practice of the invention in more detail.

EXAMPLE 1

In runs summarized in Table I, Part A and Part B an EPDM rubber semi-cured by hot-mastication with a peroxide curative is blended with various polyolefin plastics. The EPDM rubber to polyolefin plastic weight ratio ranges from 10:90 to 90:10. For comparison, some stocks are included containing no EPDM (Runs 17, 22 and 23); these are outside the invention. The EPDM rubber employed, identified as "EPDM-I," contains 47.5% ethylene, 47.5% propylene and 5% dicyclopentadiene, by weight; the Mooney viscosity is 65 (ML-4 at 250°F); the gel content of the untreated EPDM is 3% (all gel contents expressed herein, unless otherwise indicated are measured by immersion in cyclohexane for 48 hours at 73°F). The peroxide employed to semi-cure the EPDM, identified as "peroxide I," is 2,5-bis (tert-butylperoxy) -2,5-dimethylexane; it has a half-life at 347°F of .98 minute; it is employed as a 50% active commercial preparation ("Varox"). For comparison some stocks are included in which no curative is used (Runs 1,2,3,18 and 20); these are outside the invention. The polyolefin plastics employed are polypropylene, high density polyethylene, and low density polyethylene. The polypropylene employed is a largely crystalline, isotactic polypropylene, having a melt flow index of 4.0 (ASTM D1238-57T, 230°C), a specific gravity of 0.903, and 94% gel ("Profax 6523"). The polyethylene identified in Table I as "H. D. polyethylene" is a high density polyethylene having a melt flow index of 0.3 (D 1238 E, 190°C) a specific gravity of 0.956, and 90% gel ("Hifax 4601"). THe polyethylene identified in Table I as "L. D. polyethylene" is a low density polyethylene having a melt flow index of 2.0 (D 1238, 190° C) a specific gravity of 0.919, gel content nil ("DYNH"). Prior to blending the EPDM with the polyolefin resin, the EPDM is mixed with the indicated amount of peroxide curative on a warmed mill at a stock temperature usually not higher than 180°F., and then charged to a Banbury preheated to 240°F. The EPDM-peroxide mix is masticated until the temperature as read on a chart activated by a thermocouple located on the wall of the mixing chamber indicates a temperature of 360°–410°F (see "cure temperature" in Table I). This ordinarily takes about 2–3 minutes. The mixing is continued at the temperature for an additional 7–8 minutes ("cure time" in Table I). The actual stock temperature is usually about 25°–30°F higher than the chart temperature. One part (per 100 parts of EPDM) of an antioxidant, tris(nonylated phenyl) phosphite, is then added and blended in for one minute as a free-radical scavenger. The gel content, percent swell and Mooney viscosity of the thus semi-cured EPDM are then determined with the results shown in Table I.

In the next step of the process the semi-cured EPDM rubber is blended with the polyolefin plastic, in the amounts shown in Table I, in the Banbury mixer. The "blending temperature" listed in Table I is the maximum chart temperature achieved in the run (the actual stock temperatures are usually some 25° to 30° F higher); the "blending time" is the length of time for which mixing is continued at that temperature. The blending time for the blends using semi-cured EPDM rubber is about 1 minute, but for the blends using EPDM rubber that has not been pre-cured (control stocks 1,2,3,18 and 20) the blending time employed is about 7 minutes. The purpose of this is to essentially equalize the total masticating time at elevated temperature, for better comparison. The thus uniformly mixed blend is then discharged from the Banbury, formed into a sheet on a mill and chopped into pellets for further evaluation.

In Table I, the values listed as "calculated gel" are theoretical gel values of the blend calculated from the known gel contents of the two components of the blend, assuming no change in gel values of the ingredients in the course of the blending. Also listed are the actual gel values as measured on the blends, as well as the percent swell of the blends. The calculated values are somewhat less than the actual measured gel content; this may be attributed to entrappment or coating of portions of the relatively soluble EPDM by the less soluble polyolefin plastic.

The Mooney viscosities of the blends are also listed in Table I.

Portions of the pelletized blends are screw injection molded into test specimens, on which the physical properties are determined by standard test methods with the results shown in Table I. From the tensile strength, ultimate elongation and elongation set at break results, the value termed the "performance factor" as defined above is also calculated for each blend, as indicated in Table I.

The extrudability results listed in Table I are determined on a Brabender extruder (Type EX3A, No. 191) under the following conditions: screw compression ratio 2/1, screw speed 20 rpm, temperature at rear of barrel 375°F. temperature at front of barrel 400°F, die diameter one-eighth inch, temperature of die 420°F. The material is considered extrudable if the extrudate feels smooth to the touch, otherwise it is not.

The injection molding results listed in Table I are obtained by forming test pieces in an Ankerwerke screw injection molding machine (Model 75, Ser. No. 1207-P, capacity 2 oz.), using a rear barrel temperature of 375°F, a front barrel temperature of 400°F., a nozzle temperature of 420°F and a mold temperature of 100°F. The injection time is 3 seconds, holding time 10 seconds, and total cycle time is 30 seconds. The screw back pressure is 200 psi, screw speed "High," injection speed setting of 60 and maximum injection pressure is 1,000 psi. The dimensions of the mold cavity are 2 × 6 × .075 inches. The injection molded samples are evaluated by observing whether the formed specimen is homogenous, e.g., without cracks, and of uniform strength indicating that the compositions have the flow viscosity characteristics adequate for filling the mold under the operating conditions.

Press moldability of the blends is evaluated in a Pasadena hydraulic press (Model No. PW220C) set for 400°F. The sample is preheated for about 3 minutes, pressed for 5 minutes at a pressure of about 500 psi and cooled to 100°F before removal from the mold (dimensions 6 × 6 × .075 inches). The blend is considered press moldable if it is uniform in appearance and the cavity is completely filled, while excess material easily flashes out of the cavity.

Table I, Parts A and B, shows that in the course of the pre-curing step involving hot mastication with various amounts of peroxide curative the gel content of the EPDM rubber increases, from an original value of 3% to values within the range from 58 to 87%, while the % swell of the rubber decreases dramatically; also the Mooney viscosity increases. These changes are indicative of partial cure or cross-linking of the EPDM rubber.

Comparison of blends of the EPDM rubber, with and without semi-cure, with polyolefin plastic at the same ratio, vis., comparison of Run 1 (80:20 ratio, no precure) with Run 6 (80–20 ratio, with semi-cure) shows that the blend based on semi-cured EPDM (Run 6) not only has higher actual gel, lower swelling index and higher Mooney viscosity, but, more significantly, has greatly reduced elongation set at break, and a "performance factor" increase of more than 300%, while retaining good processability as evidenced by the fact that it is extrudable and moldable. Thus, performance comparable to a vulcanized rubber is provided while retaining the processability of a thermoplastic material. It will be understood that no vulcanization or cure of the material takes place during the molding of the test specimens (the action of the peroxide curative having been essentially exhausted in the pre-curing step and any residual free radicals having been scavenged by the antioxidant) and the molded or extruded specimens remain thermoplastic and repeatedly reprocessable.

Similarly the other blends of the invention exemplified exhibit desirable decrease in elongation set at break, and increase in "performance factor," while retaining thermoplastic reprocessability.

In the foregoing example, polypropylene resin having a melt flow index of 0.8 (D 1238 L, 190°C), a specific gravity of 0.903 and 99% gel ("Profax 6723"), may be substituted. Dicumyloperoxide ("Dicup 40") may be substituted as the peroxide curative.

TABLE 1

Part A Blends of EPDM with Polyolefin Plastics

| Run No. | 1 | 2 | 3 | 4 | 5 | 6 | 7 | 8 | 9 | 10 | 11 | 12 |
|---|---|---|---|---|---|---|---|---|---|---|---|---|
| EPDM I, pts. | 100 | 100 | 100 | 100 | 100 | 100 | 100 | 100 | 100 | 100 | 100 | 100 |
| Peroxide I, pts. | — | — | — | .75 | .875 | .625 | .875 | .75 | .875 | .75 | .875 | 1.0 |
| Peroxide, moles × $10^3$/100 g EPDM | — | — | — | 2.9 | 3.4 | 2.4 | 3.4 | 2.9 | 3.4 | 2.9 | 3.4 | 3.9 |
| Cure Temp. °F, max. | — | — | — | 360 | 360 | 410 | 360 | 360 | 360 | 360 | 360 | 360 |
| Cure Time, Minutes | — | — | — | 8 | 8 | 7 | 8 | 8 | 8 | 8 | 8 | 7 |
| Gel, % | 3 | 3 | 3 | 68 | 73 | 60 | 65 | 58 | 65 | 58 | 65 | 82 |
| Swell, % | 62 | 62 | 62 | 12 | 12 | 21 | 12 | 12 | 12 | 12 | 12 | 13 |
| ML-4 at 250°F | 65 | 65 | 65 | — | — | — | — | — | — | — | — | — |
| MS-4 do. | — | — | — | 47 | 60 | — | 53 | 40 | 53 | 40 | 53 | — |
| Masterbatch (EPDM), pts. | 80 | 70 | 60 | 90 | 90 | 80 | 80 | 70 | 70 | 60 | 60 | 60 |
| Polypropylene, pts. | 20 | 30 | 40 | 10 | 10 | 20 | 20 | 30 | 30 | 40 | 40 | 40 |
| H.D. Polyethylene, pts. | — | — | — | — | — | — | — | — | — | — | — | — |
| L.D. Polyethylene, pts. | — | — | — | — | — | — | — | — | — | — | — | — |
| Blending Temp. °F, max. | 360 | 360 | 360 | 360 | 360 | 360 | 360 | 360 | 360 | 360 | 360 | 360 |
| Blending Time, Minutes at Temp. | 7 | 7 | 7 | 1 | 1 | 1 | 1 | 1 | 1 | 1 | 1 | 1 |
| Calc. Gel, % | 23 | 33 | 41 | 71 | 75 | 67 | 71 | 69 | 73 | 72 | 76 | 87 |
| Actual Gel, % | 31 | 42 | 53 | 79 | 81 | 74 | 82 | 81 | 85 | 85 | 89 | 95 |
| Swell, % | 13 | 9 | 6 | 8 | 8 | 5 | 7 | 6 | 5 | 5 | 5 | 4 |
| ML-5 at 350°F | 18 | 17 | 19 | 56 | 61 | 37 | 41 | 35 | 35 | 30 | 34 | 45 |
| Tensile Strength, psi | 830 | 1125 | 1590 | 450 | 500 | 690 | 1500 | 1600 | 1950 | 2000 | 2390 | 1510 |
| 100% Modulus, psi | 830 | 1050 | 1400 | — | 500 | 680 | 1490 | 1500 | 1860 | 1900 | — | 1500 |
| Elongation, % | 120 | 220 | 420 | 80 | 130 | 100 | 100 | 190 | 150 | 210 | 80 | 110 |
| Elongation Set At Break, % | 40 | 80 | 200 | 5 | 13 | 8 | 13 | 50 | 35 | 75 | 25 | 15 |
| Hardness, Shore A | 75 | 87 | 90 | 58 | 60 | 77 | 80 | 88 | 90 | 94 | 94 | 94 |
| Performance Factor, psi × $10^3$ | 2.5 | 3.1 | 3.3 | 7.2 | 5.0 | 8.6 | 11.5 | 6.1 | 8.4 | 5.6 | 7.6 | 11. |
| Extrudable | yes | yes | yes | yes | yes | yes | yes | yes | yes | yes | yes | no |
| Injection Moldable | do. | do. | do. | do. | do. | do. | do. | do. | do. | do. | do. | yes |
| Press Moldable | do. | do. | do. | do. | do. | do. | do. | do. | do. | do. | do. | do. |

Part B Blends of EPDM with Polyolefin Plastics

| Run No. | 13 | 14 | 15 | 16 | 17 | 18 | 19 | 20 | 21 | 22 | 23 |
|---|---|---|---|---|---|---|---|---|---|---|---|
| EPDM I pts. | 100 | 100 | 100 | 100 | — | 100 | 100 | 100 | 100 | — | — |
| Peroxide I, pts. | 1.125 | 1.25 | .75 | .75 | — | — | .75 | — | .75 | — | — |
| Peroxide, moles × $10^3$/100 g EPDM | 4.3 | 5.3 | 2.9 | 2.9 | — | — | 2.9 | — | 2.9 | — | — |
| Cure Temp. °F, max | 360 | 370 | 360 | 360 | — | — | 360 | — | 360 | — | — |
| Cure Time, Minutes | 7 | 7 | 7 | 7 | — | — | 7 | — | 7 | — | — |
| Gel, % | 85 | 87 | 66 | 66 | — | 3 | 64 | 3 | 60 | — | — |
| Swell, % | 10 | 10 | — | — | — | 62 | 15 | 62 | 16 | — | — |
| ML-4 at 250°F | — | — | — | — | — | 65 | — | 65 | — | — | — |
| MS-4 do. | — | — | 88 | 88 | — | — | 48 | — | 45 | — | — |
| Masterbatch (EPDM), pts. | 60 | 60 | 35 | 10 | — | 80 | 80 | 80 | 80 | — | — |
| Polypropylene I, pts. | 40 | 40 | 65 | 90 | 100 | — | — | — | — | — | — |
| H.D. Polyethylene, pts. | — | — | — | — | — | 20 | 20 | — | — | 100 | — |
| L.D. Polyethylene, pts. | — | — | — | — | — | — | — | 20 | 20 | — | 100 |
| Blending Temp. °F, max | 360 | 360 | 360 | 360 | — | 360 | 360 | 360 | 360 | — | — |

TABLE I—Continued

Part B Blends of EPDM with Polyolefin Plastics

| Run No. | 13 | 14 | 15 | 16 | 17 | 18 | 19 | 20 | 21 | 22 | 23 |
|---|---|---|---|---|---|---|---|---|---|---|---|
| Blending Time, Minutes at Temp | 1 | 1 | 1 | 1 | — | 7 | 1 | 7 | 1 | — | — |
| Calc. Gel, % | 89 | 90 | 84 | 92 | — | 20 | 66 | 2.4 | 48 | — | — |
| Actual Gel, % | 94 | 95 | 95 | 99 | 94 | 45 | 80 | 46 | 73 | 90 | 0 |
| Swell, % | 3 | 3 | 2 | 2 | — | 8 | 7 | 10 | 7 | — | — |
| ML-5 at 350°F | 43 | 39 | 20 | 36 | off scale | 21 | 35 | 23 | 30 | — | — |
| Tensile Strength, psi | 1530 | 1520 | 3080 | 4400 | 4320 | 780 | 900 | 240 | 450 | 4000 | 1800 |
| 100% Modulus, psi | 1500 | 1500 | 2840 | — | — | 600 | 840 | 230 | 440 | — | — |
| Elongation, % | 40 | 50 | 160 | 30 | 15 | 560 | 200 | 590 | 130 | 900 | 600 |
| Elongation Set at Break, % | 5 | 3 | 140 | — | 5 | 278 | 38 | 188 | 13 | — | — |
| Hardness, Shore A | 94 | 95 | 94 | 96 | 95 | 69 | 76 | 62 | 66 | — | — |
| Performance Factor, psi × $10^3$ | 12.2 | 25. | 3.5 | — | — | 1.6 | 4.8 | .75 | 4.5 | — | — |
| Extrudable | no | no | yes | yes | yes | yes | yes | yes | yes | yes | yes |
| Injection Moldable | yes | yes | do. | do. | do. | do. | do. | do. | do. | do. | do. |
| Press Moldable | do. | do. | do. | do. | do. | do. | do. | do. | do. | do. | do. |

EXAMPLE 2

In runs 24-35, summarized in Table II, the EPDM rubber employed, identified as "EPDM II," contains 70% ethylene, 25% propylene and 5% 5-ethylidene-2-norbornene; the Mooney viscosity ML-4 at 250°F is 60, MS-4 at 250°F is 23, the gel content is 30% with 35% swell. In Run 24, which is included as a control, no precure is imparted to the EPDM. In Runs 25, 26 and 27, the EPDM is semicured by hot mastication in the Banbury using as the curative the same peroxide as in Example 1. In Runs 28-31 the substance identified in Table II as "accelerator I" is tetramethyl thiuramdisulfide, actually a sulfur donor curative for the EPDM. In Runs 32-35, in addition to the sulfur donor there is included an accelerator ("accelerator II"), 4,4'-dithiodimorpholine; Runs 33-35 further include sulfur. Runs 28-35 also have 2 parts of zinc oxide (not shown in Table II) present during the pre-cure. The procedure is essentially the same as in Example 1, that is, the EPDM is hot masticated with the curatives in the Banbury mixer to the maximum temperature shown (actual stock temperatures being 25°-30°F higher than the chart temperatures shown in Table II), and continued for the time indicated. Reduced cure times are employed in Runs 28-35 because the curative used act more rapidly. As in Example 1, 1 part of tris(nonylphenyl) phosphite antioxidant is added at the end of the semi-cure step to scavenge any residual free radicals. The gel content increases, the swelling index goes down, and the Mooney viscosity increases, as a result of the partial curing step (compare Run 24 with the other runs).

80 Parts of the thus semi-cured EPDM (designated "masterbatch" in Table II) is blended with 20 parts of the same polypropylene resin as used in Example I, by hot mixing in the Banbury. The blending time and temperature (chart temperatures; actual stock temperatures 25°-30°F higher) are as shown in Table II. The blend is removed from the Banbury, formed into a sheet and chopped into pellets, and the material is evaluated as described in Example I.

Of the results summarized in Table II, particularly significant is the decrease in elongation set at break, in the blends based on semi-cured EPDM as compared to Run 24 based on EPDM that has not been semi-cured. Also significant is the increase in the "performance factor". However, in Run 35, in which the cure of the EPDM became too far advanced in the pre-curing step, as evidenced by a high gel content of 90% in the treated EPDM, the blend is no longer processable.

TABLE II

Blends of EPDM with Polypropylene

| Run No. | 24 | 25 | 26 | 27 | 28 | 29 | 30 | 31 | 32 | 33 | 34 | 35 |
|---|---|---|---|---|---|---|---|---|---|---|---|---|
| EPDM II pts. | 100 | 100 | 100 | 100 | 100 | 100 | 100 | 100 | 100 | 100 | 100 | 100 |
| Peroxide I, pts. | — | .5 | .625 | .75 | — | — | — | — | — | — | — | — |
| Accelerator I, pts. | — | — | — | — | .5 | 1.0 | 1.5 | 2.0 | .5 | .25 | .5 | 1.0 |
| Accelerator II, pts. | — | — | — | — | — | — | — | — | .5 | .25 | .5 | 1.0 |
| Sulfur, pts. | — | — | — | — | — | — | — | — | — | .1 | .2 | .4 |
| Cure Temp. °F, max | — | 360 | 360 | 360 | 360 | 360 | 360 | 360 | 360 | 360 | 360 | 360 |
| Cure Time, Minutes | — | 7 | 7 | 7 | 4 | 4 | 4 | 4 | 4 | 4 | 4 | 4 |
| Gel, % | 30 | 47 | 60 | 67 | 36 | 42 | 52 | 59 | 60 | 68 | 74 | 90 |
| Swell, % | 35 | 14 | — | 13 | 27 | 17 | 15 | 12 | 16 | 11 | — | 6 |
| MS-4 at 250°F | 23 | 56 | 67 | 91 | 43 | 61 | 74 | 82 | 78 | 91 | off scale | off scale |
| Masterbatch (EPDM) pts. | 80 | 80 | 80 | 80 | 80 | 80 | 80 | 80 | 80 | 80 | 80 | 80 |
| Polypropylene, pts. | 20 | 20 | 20 | 20 | 20 | 20 | 20 | 20 | 20 | 20 | 20 | 20 |
| Blending Temp. °F ca. | 340 | 340 | 340 | 340 | 340 | 340 | 340 | 340 | 340 | 340 | 340 | 340 |
| Blending Time, Minutes | 7 | 1 | 1 | 1 | 1 | 1 | 1 | 1 | 1 | 1 | 1 | 1 |
| Calc. Gel, % | 43 | 57 | 67 | 73 | 48 | 53 | 61 | 66 | 67 | 73 | 78 | 91 |
| Actual Gel, % | 37 | 74 | 88 | 81 | 60 | 69 | 76 | 81 | 82 | 78 | 87 | 93 |
| Swell, % | 13 | 7 | 4 | 4 | 10 | 7 | 5 | 6 | 5 | 6 | 6 off scale | 4 |
| ML-5 at 350°F | 17 | 42 | 74 | 44 | 21 | 26 | 32 | 39 | 38 | 38 | off scale | 88 |
| Tensile Strength, psi | 1275 | 1210 | 1350 | 1230 | 1350 | 1230 | 1340 | 1340 | 1280 | 1500 | 1610 | 1390 |
| 100% Modulus, psi | 1040 | 1200 | 1200 | — | 1200 | 1190 | 1190 | 1250 | 1200 | 1380 | 1600 | 1200 |
| Elongation, % | 420 | 120 | 100 | 80 | 310 | 270 | 220 | 170 | 220 | 230 | 110 | 140 |
| Elongation Set At Break, % | 120 | 15 | 10 | 13 | 75 | 55 | 45 | 23 | 43 | 43 | 15 | 23 |

Table II—Continued

Blends of EPDM with Polypropylene

| Run No. | 24 | 25 | 26 | 27 | 28 | 29 | 30 | 31 | 32 | 33 | 34 | 35 |
|---|---|---|---|---|---|---|---|---|---|---|---|---|
| Hardness, Shore A | 83 | 85 | 89 | 86 | 84 | 86 | 84 | 86 | 86 | 85 | 85 | 86 |
| Performance Factor, psi × $10^3$ | 4.5 | 9.7 | 13.5 | 12.3 | 5.6 | 6.0 | 6.6 | 9.9 | 6.5 | 8.0 | 11.8 | 8.5 |
| Extrudable | yes | yes | no | no | yes | yes | yes | yes | no | yes | no | no |
| Injection Moldable | do. | do. | yes | yes | do. | do. | do. | do. | yes | do. | no | no |
| Press Moldable | do. | do. | do. | do. | do. | do. | do. | do. | do. | do. | yes | no |

EXAMPLE 3

Table III summarizes Runs 36–40. The EPDM employed is the same as in Example I. Run 36 is a control, involving no semi-cure of the EPDM. In Runs 37–40, partial cure is imparted to the EPDM by hot mastication in the Banbury mixer with a peroxide curative, benzoyl peroxide ("Luperco BPO"), identified as "peroxide II" in Table III, which has a half life of 0.4 hour at 212°F. The procedure is as described in Example 1. The "performance factor" is increased in Runs 37–40, compared to the control, Run 36, while retaining processability and reprocessability.

taken. In Runs 44–48 the EPDM rubber is mixed on a mill at room temperature with the indicated amount of the peroxide curative and the batch is then placed in an autoclave and heated at 400°F. for the time indicated to effect the semi-cure statically. In some cases the thus partially cured EPDM is refined by passing it three times through a mill at 200°–350°F; in other cases the refining step is omitted. The increase in gel content, decrease in percent swell and increase in Mooney viscosity (in Runs 44–48) are indicative of partial crosslinking of the EPDM as a result of the static treatment with curative.

TABLE III

Blends of EPDM with Polypropylene

| Run No. | 36 | 37 | 38 | 39 | 40 |
|---|---|---|---|---|---|
| EPDM I, pts. | 100 | 100 | 100 | 100 | 100 |
| Peroxide II, pts. | — | 1.0 | 1.25 | 1.67 | 1.86 |
| Peroxide, moles × $10^3$/100 g EPDM | — | 4.4 | 5.3 | 7.0 | 7.8 |
| Cure Temp., °F | — | 240 | 240 | 240 | 240 |
| Cure Time, Minutes | — | 4 | 4 | 4 | 4 |
| Gel, % | 3 | 45 | 50 | 62 | 61 |
| Swell, % | 65 | — | — | — | — |
| MS-4 at 250°F | 23 | 64 | 67 | 65 | 67 |
| Masterbatch, pts. | 80 | 80 | 80 | 80 | 80 |
| Polypropylene, pts. | 20 | 20 | 20 | 20 | 20 |
| Blending Temp. °F, max. | 340 | 370 | 370 | 370 | 370 |
| Blending Time, Minutes | 7 | 2 | 2 | 4 | 3 |
| Calc. Gel, % | 23 | 55 | 59 | 69 | 68 |
| Actual Gel, % | 31 | 62 | 69 | 67 | 79 |
| Swell, % | 13 | 9 | 8 | 8 | 8 |
| ML-5 at 350°F | 18 | — | — | — | — |
| Tensile Strength, psi | 830 | 810 | 910 | 980 | 1000 |
| 100% Modulus, psi | 830 | 800 | 910 | 930 | 990 |
| Elongation, % | 120 | 140 | 170 | 160 | 140 |
| Elongation Set At Break % | 40 | 33 | 40 | 38 | 23 |
| Hardness, Shore A | 75 | 79 | 78 | 77 | 80 |
| Performance Factor, psi × $10^3$ | 2.5 | 3.4 | 3.9 | 4.1 | 6.1 |
| Extrudable | yes | yes | yes | yes | yes |
| Injection Moldable | do. | do. | do. | do. | do. |
| Press Moldable | do. | do. | do. | do. | do. |

EXAMPLE 4

This example illustrates partial pre-cure of the EPDM rubber by heating under static condintions in an autoclave, rather than under dynamic conditions (hot mastication in a Banbury) as in previous examples. The materials employed are as previously identified. Run 43 (Table IV) is a control in which no semi-cure is undertaken.

After blending with the polypropylene resin [at which time 1% of tris(nonylphenyl) phosphite is also mixed in] as in previous examples, and determination of physical properties and processability of the blends marked decrease in elongation set at break with increase in "performance factor," while retaining thermoplastic reprocessability are found in Runs 44–48 of the invention as indicated in Table IV.

TABLE IV

Blends of EPDM with Polypropylene

| Run No. | 43 | 44 | 45 | 46 | 47 | 48 |
|---|---|---|---|---|---|---|
| EPDM I, pts. | 100 | 100 | 100 | 100 | 100 | 100 |
| Peroxide I, pts. | — | .125 | .125 | .375 | .375 | .75 |
| Cure Temp., °F | — | 400 | 400 | 400 | 400 | 400 |
| Cure Time, Minutes | — | 20 | 20 | 20 | 20 | 15 |
| Refined | — | no | yes | no | yes | no |
| Gel, % | 3 | 39 | 2.6 | 61 | 60 | 76 |
| Swell, % | 62 | 48 | 46 | 35 | 36 | — |
| MS-4 at 250°F | 37 | — | — | — | — | 53 |

TABLE IV—Continued

Blends of EPDM with Polypropylene

| | | | | | | |
|---|---|---|---|---|---|---|
| Masterbatch, pts. | 80 | 80 | 80 | 80 | 80 | 80 |
| Polypropylene, pts. | 20 | 20 | 20 | 20 | 20 | 20 |
| Blending Temp. °F, Max | 360 | 360 | 360 | 360 | 360 | 360 |
| Blending Time, Minutes | 7 | 1 | 1 | 1 | 1 | 1 |
| Calc. Gel, % | 23 | 50 | 40 | 68 | 67 | 79 |
| Actual Gel, % | 31 | — | — | — | — | 84 |
| Swell, % | 13 | — | — | — | — | — |
| ML-5 at 350°F | 18 | — | — | — | — | 36 |
| Tensile Strength, psi | 830 | 990 | 930 | 1080 | 1100 | 820 |
| 100% Modulus, psi | 830 | — | — | — | — | — |
| Elongation, % | 120 | 120 | 110 | 100 | 120 | 83 |
| Elongation Set At Break % | 40 | 28 | 20 | 15 | 18 | 9 |
| Hardness, Shore A | 75 | 75 | 74 | 80 | 80 | 90 |
| Performance Factor, psi × $10^3$ | 2.5 | 4.2 | 5.1 | 7.2 | 7.3 | 7.6 |
| Extrudable | yes | yes | yes | yes | yes | no |
| Injection Moldable | do. | do. | do. | do. | do. | yes |
| Press Moldable | do. | do. | do. | do. | do. | do. |

EXAMPLE V

Table V illustrates the practice of the invention with a saturated EPM binary copolymer rubber [40% ethylene, 60% propylene, by weight; ML-4 at 250°F is less than 20; gel content, nil ("Vistalon 404")]. The curative identified as "OBSA" in Table V, is p,p′-oxybis(-benzenesulfonylazide). No curative is used in Run 49 (a control). In runs 50–53 the curative, in the amounts shown, is mixed with the EPM on an unheated roll mill. The EPM-curative mix is placed in an autoclave and heated to 360°F, under a pressure of 150 psi steam for 20 minutes to effect the partial cure statically. The steam pressure prevents the mixture from blowing. The resulting semi-cured EPM is removed from the autoclave and blended with the polypropylene along with 1% of the antioxidant, in the Banbury at the blending temperature (chart temperature) shown for the time indicated. Table V shows that the semi-cure increases the gel content and Money viscosity, and decreases the swelling index of the EPM. In the blends, elongation set at break is greatly reduced, and "performance factor" is greatly increased.

TABLE V

Blends of EPM with Polypropylene

| Run No. | 49 | 50 | 51 | 52 | 53 |
|---|---|---|---|---|---|
| EPM, pts. | 100 | 100 | 100 | 100 | 100 |
| OBSA, pts. | — | .5 | 1.0 | 1.5 | 2.0 |
| Cure Temp. °F | — | 360 | 360 | 360 | 360 |
| Cure Time, Minutes | — | 20 | 20 | 20 | 20 |
| Gel, % | 0 | 66 | 77 | 82 | 83 |
| Swell, % | 90+ | 23 | 14 | 11 | 11 |
| MS-4 at 250°F | 20 | 50 | 62 | 75 | 79 |
| Masterbatch, pts. | 80 | 80 | 80 | 80 | 80 |
| Polypropylene, pts. | 20 | 20 | 20 | 20 | 20 |
| Blending Temp. °F | 360 | 360 | 360 | 360 | 360 |
| Blending Time, Minutes at Temp. | 7 | 2 | 2 | 2 | 2 |
| Calc. Gel, % | 19 | 72 | 81 | 85 | 85 |
| Actual Gel, % | 31 | 66 | 77 | 80 | 83 |
| Swell, % | 12 | 8 | 9 | 8 | 7 |
| ML-5 at 350°F | 8 | 41 | 48 | 47 | 50 |
| Tensile Strength, psi | 650 | 960 | 1040 | 1180 | 1150 |
| 100% Modulus, psi | 450 | — | — | — | — |
| Elongation, % | 440 | 80 | 70 | 40 | 60 |
| Elongation Set at Break, % | 220 | 8 | 10 | 5 | 10 |
| Hardness, Shore A | 72 | 80 | 85 | 85 | 76 |
| Performance Factor, psi × $10^3$ | 1.2 | 9.6 | 7.3 | 9.5 | 6.9 |
| Extrudable | yes | no | no | no | no |
| Injection Moldable | do. | yes | yes | no | no |
| Press Moldable | do. | do. | do. | yes | yes |

Having thus described our invention what we claim and desire to protect by Letters Patent is:

1. A rubbery copolymer of ethylene and at least one other copolymerizable monoolefin of the formula $CH_2{=}CHR$ where R is an alkyl radical having from 1 to 12 carbon atoms, with or without at least one copolymerizable polyene, said copolymer being partially cross-linked to a gel content of at least 30% but less than 90% by weight measured by immersion in cyclohexane for 48 hours at 73°F.

2. A rubbery copolymer of ethylene and at least one other copolymerizable monoolefin of the formula $CH_2{=}CHR$ where R is an alkyl radical having from 1 to 12 carbon atoms, with or without at least one copolymerizable polyene, the said rubbery copolymer being semi-cured until it has a gel content, measured by immersion in cyclohexane for 48 hours at 73°F., at least 10% higher than the gel content of the said rubbery copolymer prior to said semi-cure but less than 90%.

3. A rubbery copolymer of ethylene and at least one other copolymerizable monoolefin of the formula $CH_2{=}CHR$ where R is an alkyl radical having from 1 to 12 carbon atoms, with or without at least one copolymerizable polyene, said copolymer being partially cross-linked to a gel content of of at least 30% but less than 90% by weight measured by immersion in cyclohexane for 48 hours at 73°F, said gel content being at least 10% higher than the gel content of said rubbery copolymer prior to said partial cross-linking, the said partial cross-linking having been effected while dynamically working the said rubbery copolymer, and the said partially cross-linked rubbery copolymer being capable of forming a continuous band on a mill.

* * * * *